(12) United States Patent
Haseltine

(10) Patent No.: US 10,389,146 B2
(45) Date of Patent: Aug. 20, 2019

(54) ENERGY HARVESTING FROM A MOBILE DEVICE

(71) Applicant: Disney Enterprises, Inc., Burbank, CA (US)

(72) Inventor: Eric C. Haseltine, Burbank, CA (US)

(73) Assignee: Disney Enterprises, Inc., Burbank, CA (US)

( * ) Notice: Subject to any disclaimer, the term of this patent is extended or adjusted under 35 U.S.C. 154(b) by 74 days.

(21) Appl. No.: 15/688,650

(22) Filed: Aug. 28, 2017

(65) Prior Publication Data

US 2019/0067963 A1    Feb. 28, 2019

(51) Int. Cl.
*H02J 7/00* (2006.01)

(52) U.S. Cl.
CPC .......... *H02J 7/0027* (2013.01); *H02J 7/0047* (2013.01); *H02J 7/0052* (2013.01); *H02J 7/0065* (2013.01)

(58) Field of Classification Search
CPC . H04B 5/00; H02J 7/0027; H02J 50/15; H02J 50/20; H02J 50/30
USPC .......................................... 320/108; 307/104
See application file for complete search history.

(56) References Cited

U.S. PATENT DOCUMENTS

| 8,159,090 | B2 * | 4/2012 | Greene | H02J 17/00 307/104 |
| 2011/0248665 | A1 * | 10/2011 | Smith | G03H 1/2294 320/101 |
| 2013/0241474 | A1 * | 9/2013 | Moshfeghi | H02J 7/0027 320/108 |

* cited by examiner

*Primary Examiner* — Zixuan Zhou
(74) *Attorney, Agent, or Firm* — Farjami & Farjami LLP

(57) ABSTRACT

According to one implementation, a system for harvesting energy from a mobile device includes a housing having a receptacle for receiving the mobile device, a battery situated within the housing, an energy collection interface including at least one transducer coupled to the battery by a power bus, and one or more auxiliary electronic components coupled to the battery by the power bus. The system is configured to receive, via the receptacle, the mobile device, and to receive, via the energy collection interface, an energy emitted by the mobile device. The system is also configured to generate, by the one or more transducers, a current, using the energy received from the mobile device, and to feed, via the power bus, the current to at least one of the battery and the at least one auxiliary electronic component.

16 Claims, 4 Drawing Sheets

ENERGY HARVESTING FROM A MOBILE DEVICE

BACKGROUND

Mobile devices such as smartphones, tablet computers, and smartwatches may be connected to various external devices to provide users with productive and entertaining experiences. For example, some augmented reality (AR) viewing systems are designed to accept a smartphone in order to display virtual digital imagery superimposed over images of a real physical environment.

In some such applications, it may be advantageous or desirable to add electronic features to the system into which the mobile device is inserted or attached. For instance, lights, amplifiers, speakers, and other auxiliary electronics can significantly enhance the utility of the mobile-embedded or mobile-connected system. However, conventional solutions for powering those auxiliary electronics can undesirably add to the cost, weight, size, and complexity of mobile-embedded or mobile-connected systems.

SUMMARY

There are provided systems and methods for energy harvesting from a mobile device, substantially as shown in and/or described in connection with at least one of the figures, and as set forth more completely in the claims.

DETAILED DESCRIPTION

Figure 1A:
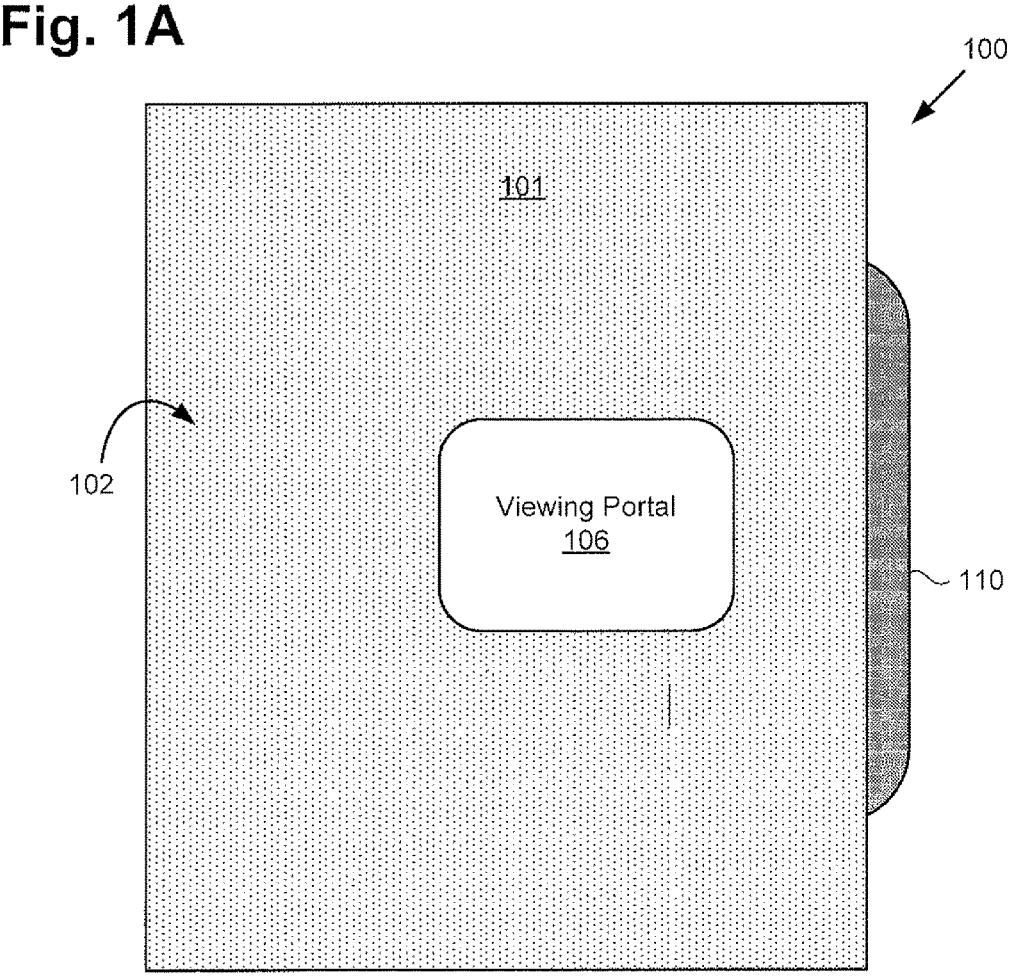
FIG. 1A shows a front view of an exemplary system for harvesting energy from a mobile device, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

As stated above, mobile devices such as smartphones, tablet computers, and smartwatches may be connected to various external devices to provide users with productive and entertaining experiences. As one example, some augmented reality (AR) viewing systems are designed to accept a smartphone in order to display virtual digital imagery superimposed over images of a real physical environment. As another example, a holographic viewer may provide a virtual holographic display including imaging optics designed to create an illusion of a floating three-dimensional (3D) image from objects rendered on the display screen of a smartphone or tablet computer that is inserted into the holographic viewer.

As also stated above, in some such applications, it may be advantageous or desirable to add electronic features to the system into which the mobile device is inserted or attached. For instance, lights, amplifiers, speakers, sensors, and/or other auxiliary electronics can significantly enhance the utility of a mobile-embedded or mobile-connected system. However, conventional solutions for powering those auxiliary electronics can undesirably add to the cost, weight, size, and complexity of mobile-embedded or mobile-connected systems.

The present application discloses solutions for harvesting energy from a mobile device that address and overcome the deficiencies in the conventional art described above. By receiving a mobile device via a receptacle of a system housing designed to accept the mobile device, the present solution can orient the mobile device for energy harvesting. In addition, by utilizing one or more transducers of an energy collecting interface of the system to receive energy emitted by the mobile device, the present solution results in generation of an electric current (hereinafter "current") from the emitted energy. Moreover, by feeding the current to a battery and/or one or more auxiliary electronic components of the system via a power bus of the system, the present solution advantageously enables powering of the auxiliary electronic component or components using the energy harvested from the mobile device.

FIG. 1A shows a front view of an exemplary system for harvesting energy from a mobile device, according to one implementation. As shown in FIG. 1A, system 100 includes rigid or semi-rigid case or housing 101 (hereinafter "housing 101") having front side 102, viewing portal 106 situated at front side 102, and a receptacle for receiving mobile device 110. Also shown in FIG. 1A is mobile device 110 depicted as having been received within the receptacle of system 100 provided for that purpose.

System 100 may be implemented as an augmented reality (AR) viewing system, for example, designed to receive mobile device 110 in the form of a smartphone or tablet computer. In such an implementation, system 100 may display virtual digital imagery superimposed over images of a real physical environment of a user of system 100, via viewing portal 106. Alternatively, system 100 may be implemented as a virtual reality (VR) viewing system, designed to receive mobile device 110 in the form of a smartphone or tablet computer and to display a fully immersive virtual environment independent of the real physical environment of the user. In yet another implementation, system 100 may take the form of a holographic viewer providing a virtual holographic display.

Viewing portal 106 may take the form of a liquid crystal display (LCD), a light-emitting diode (LED) display, an organic light-emitting diode (OLED) display, or another suitable display screen that performs a physical transformation of signals to light. Alternatively, viewing portal 106 may include imaging optics designed to create an illusion of a floating 3D image from one or more objects rendered on a display screen of mobile device 110, which may itself be any of an LCD, LED display, OLED display or another suitable display screen that performs a physical transformation of signals to light.

Figure 1B:
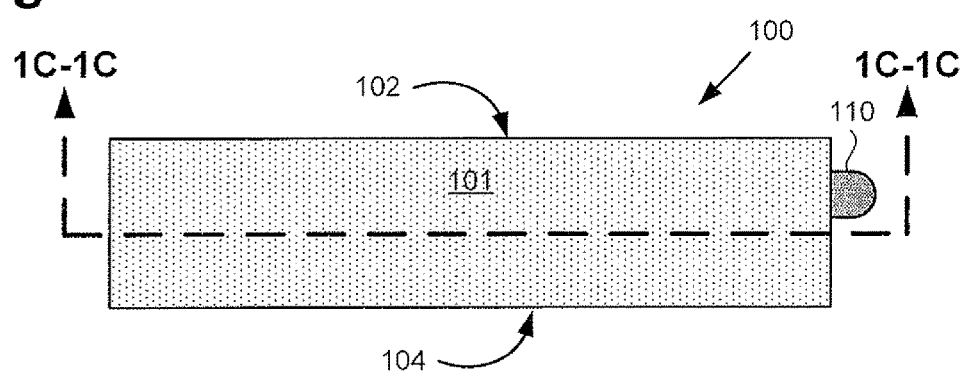
FIG. 1B shows a top view of the exemplary system of FIG. 1A.

FIG. 1B shows a top view of system 100 for harvesting energy from mobile device 110. FIG. 1B shows housing 101 of system 100, including front side 102, also shown in FIG. 1A, and back side 104 opposite front side 102. FIG. 1B further shows a top view of mobile device 110 inserted into system 100, i.e., received by the receptacle of system 100.

Figure 1C:
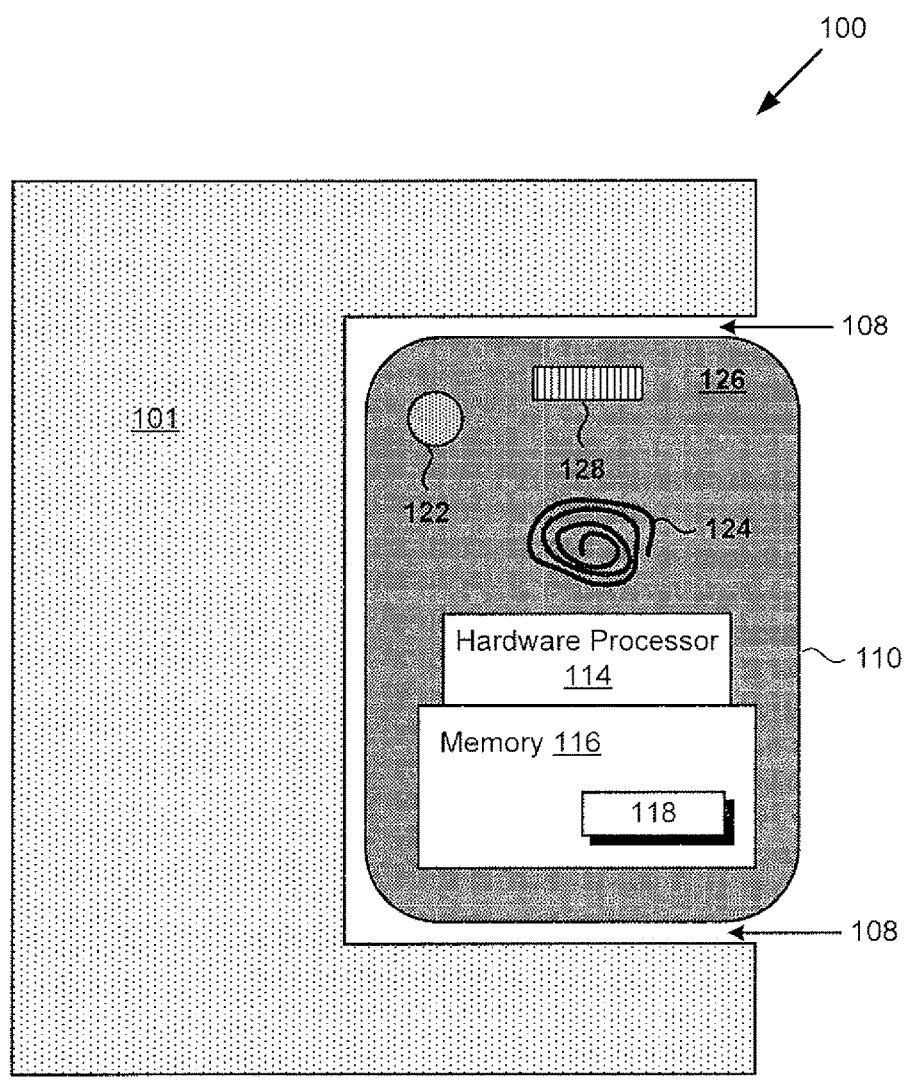
FIG. 1C shows a cross-sectional view of the exemplary system of FIGS. 1A and 1B along perspective lines 1C-1C in FIG. 1B.

FIG. 1C shows a cross-sectional view of exemplary system 100 along perspective lines 1C-1C in FIG. 1B. FIG. 1C more clearly depicts receptacle 108 of system 100, which is designed to receive mobile device 110. It is noted that, although in the exemplary implementation of system 100 described thus far, system 100 is designed to receive mobile device 110, but does not include mobile device 110, in other implementations, system 100 may include mobile device 110.

As note above, mobile device 110 may take the form of a smartphone or tablet computer, for example. Other examples of mobile device 110 can include a digital media player, or a smartwatch or other smart wearable item. As shown in FIG. 1C, mobile device 110 includes case 126 enclosing hardware processor 114 and memory 116. In addition, mobile device 110 may include one or more of light source 122, radio frequency (RF) transmission coil 124, and speaker 128. Moreover, in implementations in which mobile device 110 is included as part of system 100, mobile device may include energy transfer application 118 stored in memory 116.

Figure 1D:
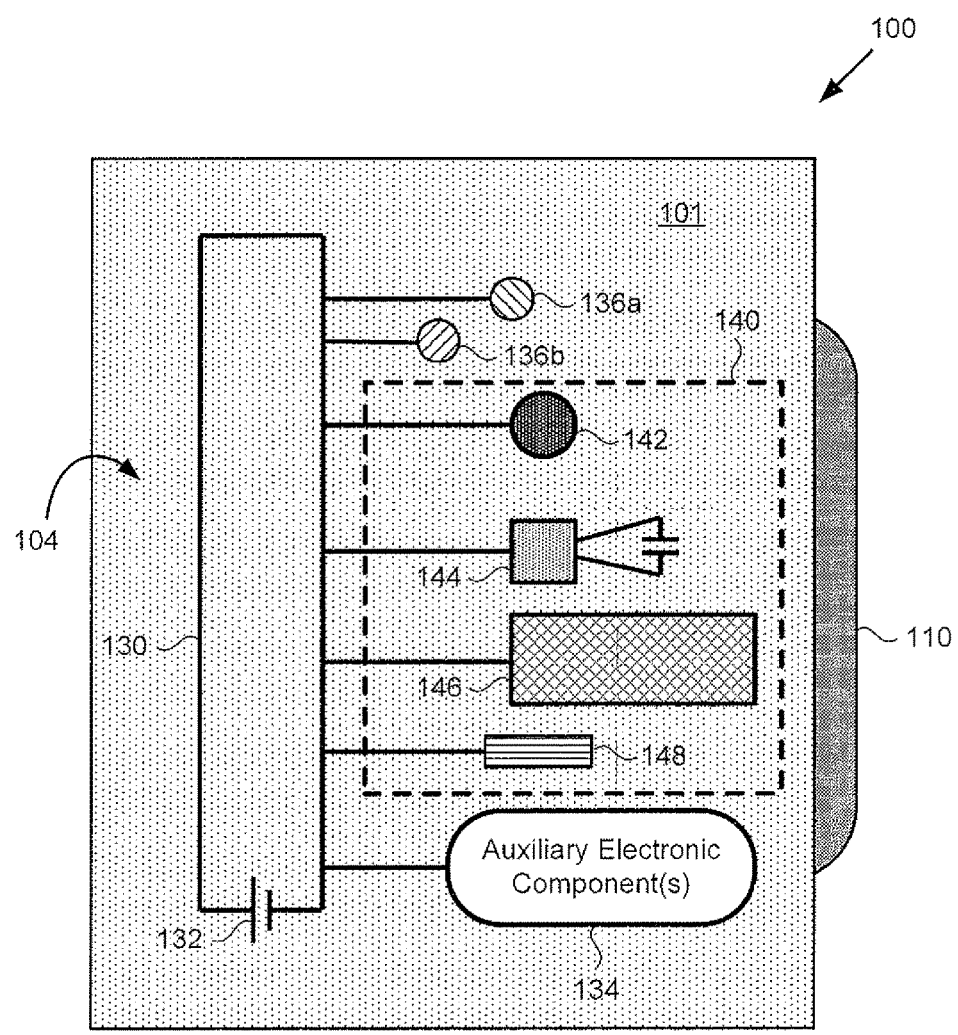
FIG. 1D shows exemplary energy harvesting circuitry for use in the system of FIGS. 1A, 1B, and 1C, according to one implementation.

FIG. 1D shows exemplary energy harvesting circuitry situated within housing 101 of system 100, according to one implementation. It is noted that the circuitry shown in FIG. 1D is depicted as though "seen through" back side 104 of housing 101.

According to the present exemplary implementation, the energy harvesting circuitry of system 100 includes battery 132, energy collection interface 140 including one or more of light sensitive transducer 142, RF signal transducer 144, thermal transducer 146, and acoustic transducer 148. As shown in FIG. 1D, the one or more of light sensitive transducer 142, RF signal transducer 144, thermal transducer 146, and acoustic transducer 148 is/are coupled to battery 132 by power bus 130 of system 100. Also shown in FIG. 1D are battery level indicators 136a and 136b, and one or more auxiliary electronic component(s) 134 of system 100, coupled to battery 132 by power bus 130.

Battery level indicators 136a and 136b may be implemented as colored LEDs, for instance. As a specific example, battery level indicator 136a may be a high battery level indicator designed to emit green light when a state-of-charge (SOC) of battery 132 meets or exceeds a predetermined threshold. By analogy, battery level indicator 136b may be a low battery level indicator designed to emit red light when the SOC of battery 132 meets or falls below the same or another predetermined threshold. It is noted that although the feature identified by reference number 132 has heretofore been referred to as battery 132, in another implementation, that feature may be implemented using a capacitor, i.e., capacitor 132.

One or more auxiliary electronic component(s) 134 of system 100 may take a variety of forms. For instance, auxiliary electronic component(s) 134 may include one or more of a light or lights, an amplifier or amplifiers, a speaker or speakers, a sensor or sensors, and a motor or motors, to name a few examples.

As noted above, energy collection interface 140 includes one or more of light sensitive transducer 142, RF signal transducer 144, thermal transducer 146, and acoustic transducer 148. That is to say, energy collection interface 140 may include multiple transducers, each designed to convert a different type of energy to current. In addition, energy collection interface 140 may further include other commonly utilized circuit elements known in the art, such as a voltage converter and/or regulator coupled to power bus 130 and designed to output a direct current (DC) voltage, such as a nominal 3.5 volts DC, for example, to power bus 130.

Light sensitive transducer 142 may include a photovoltaic cell, for example, positioned within housing 101 so as to capture light energy emitted by light source 122 of mobile device 110 when mobile device 110 is received in receptacle 108. Light sensitive transducer 142 is designed to convert the light emitted by mobile device 110 to a current for charging battery 132 and/or for powering one or more auxiliary electronic component(s) 134 of system 100. RF signal transducer 144 may include an RF inductive pickup designed to generate a current by inductive coupling to an RF signal, such as a cellular, WiFi, or Bluetooth signal, for example, emitted by RF transmission coil 124 of mobile device 110. RF signal transducer 144 is designed to convert the RF signal emitted by mobile device 110 to a current for charging battery 132 and/or for powering one or more auxiliary electronic component(s) 134 of system 100.

Thermal transducer 146 may include a thereto-electric converter such as a Peltier cell, for example, positioned within housing 101 so as to contact case 126 of mobile device 110 when mobile device 110 is received in receptacle 108, and to absorb heat generated by mobile device 110. Thermal transducer 146 is designed to convert heat generated by mobile device 110 to a current for charging battery 132 and/or for powering one or more auxiliary electronic component(s) 134 of system 100. Acoustic transducer 148 may include a sol-gel or resonant cavity, for example, designed to convert sound emitted by mobile device 110 when mobile device 110 is received in receptacle 108 to a current for charging battery 132 and/or for powering one or more auxiliary electronic component(s) 134 of system 100. As a specific example, acoustic transducer 148 may include a resonant cavity lined with a piezoelectric material and designed to resonate at approximately 500 hertz.

Figure 2:
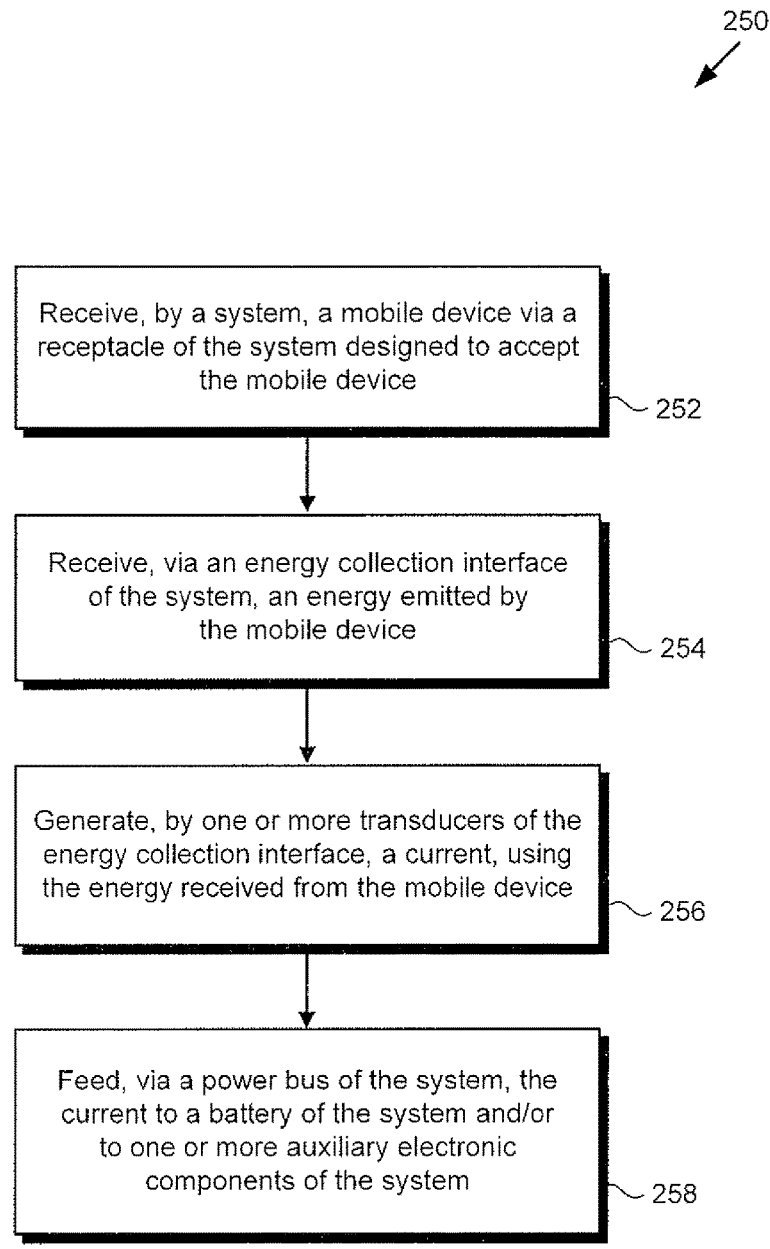
FIG. 2 shows a flowchart presenting an exemplary method for harvesting to energy from a mobile device, according to one implementation.

The functionality of system 100 will be further described by reference to FIG. 2 in combination with FIGS. 1A, 1B, 1C, and 1D. FIG. 2 shows flowchart 250 presenting an exemplary method for harvesting energy from a mobile device, according to one implementation. With respect to the method outlined in FIG. 2, it is noted that certain details and features have been left out of flowchart 250 in order not to obscure the discussion of the inventive features in the present application.

Flowchart 250 begins with receiving, by system 100, mobile device 110 via receptacle 108 designed to accept mobile device 110 (action 252). As noted above, system 100 may be an AR, VR, or holographic viewing system, for example. In those exemplary implementations, a user of system 100 may utilize viewing portal 106 in conjunction with a display screen of mobile device 110 received by system 100 via receptacle 108 to enjoy a respective AR, VR, or holographic viewing experience.

Flowchart 250 continues with receiving, via energy collection interface 140 of system 100, energy emitted by mobile device 110 (action 254). As noted above, energy collection interface 140 may include one or more of light sensitive transducer 142, RF signal transducer 144, thermal transducer 146, and acoustic transducer 148. Consequently, system 100 may be designed to receive one or more of light emitted by mobile device 110, RF signals emitted by mobile device 110, heat generated by mobile device 110, and sound emitted by mobile device 110, via energy collection interface 140.

Flowchart 250 continues with generating, by one or more of light sensitive transducer 142, RF signal transducer 144, thermal transducer 146, and acoustic transducer 148, a current using the energy received from mobile device 110 (action 256). For example, in implementations in which energy collection interface 140 includes light sensitive transducer 142, system 100 may use light sensitive transducer 142 to convert light emitted by mobile device 110 to current. Alternatively, or in addition, in implementations in which energy collection interface 140 includes RF signal transducer 144, system 100 may use RF signal transducer 144 to convert RF signals emitted by mobile device 110 to current.

As a further alternative or additional source of current, in implementations in which energy collection interface 140 includes thermal transducer 146, system 100 may use thermal transducer 146 to convert heat generated by mobile device 110 to current. As yet another exemplary alternative or additional source of current, in implementations in which energy collection interface 140 includes acoustic transducer 148, system 100 may use acoustic transducer 148 to convert sound emitted by mobile device 110 to current.

Flowchart 250 can conclude with feeding, via power bus 130, the current generated in action 256 to battery 132 and/or to one or more auxiliary electronic component(s) 134 of system 100 (action 258). Thus, system 100 can advantageously use one or more of emitted light, RF signals, or emitted sound from mobile device 110, or heat generated by mobile device 110, for charging battery 132 and/or for powering one or more auxiliary electronic component(s) 134.

As noted above, in some implementations, system 100, in addition to being designed to receive mobile device 110 via receptacle 108, may include mobile device 110 as one of its features. In those implementations, mobile device 110 may include energy transfer application 118 stored in memory 116. Moreover, in those implementations, hardware processor 114 of mobile device 110 may execute energy transfer application 118 to participate in harvesting of energy from mobile device 110 in various ways.

For instance, in one such implementation, hardware processor 114 may execute is energy transfer application 118 to detect a battery charge status of battery 132 from battery level indicators 136a and 136b, which may be respective green and red LED light indicators, for example. In one exemplary implementation, hardware processor 114 may execute energy transfer application 118 to activate a camera of mobile device 110 to detect whether high battery level indicator 136a is emitting green light or low battery level indicator 136b is emitting red light. In implementations in which hardware processor 114 executes energy transfer application 118 to detect a battery charge status of battery 132, hardware processor 114 may further execute energy transfer application 118 to selectively initiate energy emission by mobile device 110 when the SOC of battery 132 is determined to be low.

In addition, or alternatively, hardware processor 114 may execute energy transfer application 118 to detect the one or more transducers 142/144/146/148 included in energy collection interface 140, and to cause mobile device 110 to emit energy as a type of energy convertible by one or more of the detected transducer(s) to a current. For example, hardware processor 114 may execute energy transfer application 118 to utilize near-field communication (NFC) capabilities of mobile device 110 to detect and identify the type or types of transducers included in energy collection interface 140, and to advantageously cause mobile device 110 to emit energy capable of being converted to current by that/those transducer(s).

Thus, the present application discloses solutions for harvesting energy from a mobile device. By receiving a mobile device via a receptacle of a system housing designed to accept the mobile device, the present solution can orient the mobile device for energy harvesting. In addition, by utilizing one or more transducers of an energy collecting interface of the system to receive energy emitted by the mobile device, the present solution results in generation of a current from the emitted energy. Moreover, by feeding the current to a battery and/or one or more auxiliary electronic components of the system via a power bus of the system, the present solution advantageously enables powering of the auxiliary electronic component or components using the energy harvested from the mobile device.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A system configured to harvest energy from a mobile computing device having a display, the system comprising:
    a housing including a receptacle for attaching to and detaching from the mobile computing device;
    a battery situated within the housing;
    an energy collection interface including at least one transducer coupled to the battery by a power bus; and
    a holographic viewer coupled to the battery by the power bus;
    the system configured to:
        receive, via the receptacle, the mobile computing device;
        receive, via the energy collection interface, an energy emitted by the mobile computing device;
        generate, by the at least one transducer, a current, using the energy received from the mobile computing device;
        feed, via the power bus, the current to the battery coupled to the holographic viewer; and
        provide, using the holographic viewer powered by the battery, imaging optics to create an illusion of a floating three-dimensional (3D) image from objects rendered on the display of the mobile computing device.

2. The system of claim 1, wherein the at least one transducer comprises a plurality of transducers each configured to convert a different type of energy to the current.

3. The system of claim 1, wherein the at least one transducer is configured to convert light emitted by the mobile computing device to the current.

4. The system of claim 1, wherein the at least one transducer is configured to convert a radio frequency (RF) signal emitted by the mobile computing device to the current.

5. The system of claim 1, wherein the at least one transducer is configured to convert heat generated by the mobile computing device to the current.

6. The system of claim 1, wherein the at least one transducer is configured to convert sound emitted by the mobile computing device to the current.

7. The system of claim 1, wherein the mobile computing device includes a hardware processor and a memory storing an energy transfer application.

8. The system of claim 7, wherein the system is further configured to, before receiving the energy emitted by the mobile computing device via the energy collection interface:
   detect, by the mobile computing device and using the energy transfer application, the at least one transducer of the energy collection interface; and
   emit, by the mobile computing device and using the energy transfer application, the energy as a type of energy convertible by the transducer to the current.

9. A method for use by a system configured to harvest energy from a mobile computing device having a display, the system comprising a housing including a receptacle for attaching to and detaching from the mobile computing device, a battery situated within the housing, an energy collection interface including at least one transducer coupled to the battery by a power bus, and a holographic viewer coupled to the battery by the power bus, the method comprising:
   receiving, via the receptacle, the mobile computing device;
   receiving, via the energy collection interface, an energy emitted by the mobile computing device;
   generating, by the at least one transducer, a current, using the energy received from the mobile computing device;
   feeding, via the power bus, the current to the battery coupled to the holographic viewer; and
   providing, using the holographic viewer powered by the battery, imaging optics to create an illusion of a floating three-dimensional (3D) image from objects rendered on the display of the mobile computing device.

10. The method of claim 9, wherein the at least one transducer comprises a plurality of transducers each configured to convert a different type of energy to the current.

11. The method of claim 9, wherein the at least one transducer is configured to convert light emitted by the mobile computing device to the current.

12. The method of claim 9, wherein the at least one transducer is configured to convert a radio frequency (RF) signal emitted by the mobile computing device to the current.

13. The method of claim 9, wherein the at least one transducer is configured to convert heat generated by the mobile computing device to the current.

14. The method of claim 9, wherein the at least one transducer is configured to convert sound emitted by the mobile computing device to the current.

15. The method of claim 9, wherein the mobile computing device includes a hardware processor and a memory storing an energy transfer application.

16. The method of claim 15, wherein the method further comprises, before receiving the energy emitted by the mobile computing device via the energy collection interface:
   detecting, by the mobile computing device and using the energy transfer application, the at least one transducer of the energy collection interface; and
   emitting, by the mobile computing device and using the energy transfer application, the energy as a type of energy convertible by the transducer to the current.

* * * * *